United States Patent [19]
Tzoganakis et al.

[11] Patent Number: 6,114,445
[45] Date of Patent: *Sep. 5, 2000

[54] HYDROSILYLATION OF POLYPROPYLENE

[75] Inventors: Costas Tzoganakis, Kitchener, Canada; Hauke Malz, Diepholz, Germany

[73] Assignee: University of Waterloo, Waterloo, Canada

[21] Appl. No.: 09/011,664

[22] PCT Filed: Jun. 12, 1997

[86] PCT No.: PCT/CA97/00412

§ 371 Date: Dec. 17, 1998

§ 102(e) Date: Dec. 17, 1998

[87] PCT Pub. No.: WO97/47665

PCT Pub. Date: Dec. 18, 1997

Related U.S. Application Data

[60] Provisional application No. 60/019,678, Jun. 13, 1996.

[51] Int. Cl.$^7$ ..................................................... C08F 8/00
[52] U.S. Cl. ........................... 525/102; 525/105; 525/106; 525/332.8; 525/332.4; 525/333.1; 525/333.2; 525/333.7
[58] Field of Search ................................. 525/102, 105, 525/106, 342

[56] References Cited

U.S. PATENT DOCUMENTS

| | | |
|---|---|---|
| 3,715,334 | 2/1973 | Karstedt . |
| 4,803,244 | 2/1989 | Umpleby . |
| 5,359,113 | 10/1994 | Bank . |

FOREIGN PATENT DOCUMENTS

| | | |
|---|---|---|
| 0201371 | 11/1986 | European Pat. Off. . |
| 0320259 | 6/1989 | European Pat. Off. . |
| 0658575 | 6/1995 | European Pat. Off. . |
| 0 709 403 | 5/1996 | European Pat. Off. . |
| 2110706 | 6/1983 | United Kingdom . |

OTHER PUBLICATIONS

Sommer, L. H., Pietrusza, E. W. & Whitmore, F. C., *J Am. Chem. Soc.* 69:188 (1947).

Ojima, I. In *The chemistry of Organic Silicon Compounds* (eds Patai, S. & Rappoport, Z.) 1479–1527 (John Wiley and Sons Ltd. New York, Toronto, 1989).

Mc Grath, M. P., Sall, E. D. & Tremont, S. *J. Chem. Rev.* 95: 381–398 (1995).

Marciniec, B. Gulinski, J. Urbaniac, W. & Kometka, Z. W., *Comprehensive Handbook On Hydrosilylation* (Pergamon Press, Oxford, New York, Seoul, Tokyo, 1992).

Dorn M., *Advances in Polymer Technology* 5, 87–97 (1995).

Tzoganakis, C., Peroxide Degradation Of Polypropylene During Reactive Extrusion. (1988). McMaster University. Ph.D.

Lewis, L. N. & Lewis, N., *J Am. Chem. Soc.* 108: 7228–7231 (1986).

Lewis, L. N., *J Am. Chem. Soc.* 112: 5998–6004 (1990).

Taylor, R. B., Parbhoo, B. & Fillmore, D. M. in *The Analytical Chemistry of Silicones* (ed Smith, A.L.) 347–419 (John Wiley and Sons, New York, Toronto, 1991).

Goldstein, G. I. *Scanning Electron Microscopy and X–Ray Micro–Analysis* (Plenum Press, New York, London, 1981).

Atochem, Evaluation of Organic Peroxides From Half–Life Data. (1992).

Hinsken, H., Moss, S., Pauquet, J. & Zweifel, H. *Polymer Degradation and Stability* 34: 279–293 (1991).

Box, G. E. P. Hunter, W. G. & Hunter, S. J. *Statistics For Experimenters* (John Wiley & Sons Inc. New York, Toronto, 1995).

Dvornic, P. R. & Gerov, V. V. *Macromolecules* 27: 1068–1070 (1994).

Hazziza–Lasker, J. Helary, G. & Sauvet, G., *Makromol. Chem. Macromol. Symp.* 47: 383–391 (1991).

*Primary Examiner*—Bernard Lipman
*Attorney, Agent, or Firm*—Sim & McBurney

[57] ABSTRACT

The hydrosilylation of terminal double bonds in polypropylene (PP) or other polymers is effected in the melt phase. The double bonds were created by peroxide initiated degradation of PP in an extruder or a batch mixer. A hydride terminated polydimethylsiloxane is employed as a model substance to investigate the feasibility of hydrosilylating the terminal double bonds of the degraded polypropylene. The reaction may be carried out in three different reactors, namely a hot press, a batch mixer and a screw extruder. Two different reaction mechanisms may be used to effect the hydrosilylation reaction, namely a radical chain addition mechanism and a platinum catalysed mechanism with a colloid forming catalyst, platinum divinyltetramethyldisiloxane (Karstedt's catalyst). Catalytic amounts of a peroxide initiator are able to initiate the addition of silanes to the double bonds of the degraded polypropylene. Both reactions, namely degradation and hydrosilylation, may be performed simultanously. A platinum colloid formed in the initial stage of the platinum catalysed hydrosilylation may be stabilized by adding t-butylhydroperoxide as cocatalyst, which results in the hydrosilylation at high yields.

16 Claims, 6 Drawing Sheets

FTIR 1

FTIR 2

FTIR 3

HYDROSILYLATION OF POLYPROPYLENE this application claims benefit of Appln. No. 60/019,678 filed Jun. 13, 1996.

FIELD OF INVENTION

The present invention relates to the hydrosilylation of polypropylene and other polymers, particularly terminal double bonds provided therein.

BACKGROUND TO THE INVENTION

The hydrosilylation reaction, namely the addition of a silicon hydride to a multiple bond, such as carbon-carbon, carbon-nitrogen, nitrogen-nitrogen, carbon-oxygen and nitrogen-oxygen, was first reported in 1947 by Sommer, Pietrusza and Whitmore (ref. 1—the identification of the references appears at the end of the specification). Since then the reaction has been intensively studied and is currently the subject of 44 reviews. Hydrosilylation can be catalysed radically, ionically or with a metal complex, such as platinum, rhodium, palladium. One of the advantages of the platinum-catalysed hydrosilylation is the tolerance of the reaction concerning the presence of functional groups. Oxiranes, acetals, esters, nitriles, amines, amides, nitro, ketone, carbamate, ether, isocyanate, phosphate, phosphonic dichloride, dialkoxy borane, sulfide, sulfone or carborane groups can be present without reacting (ref. 2). Many of these functional groups are of considerable interest in polymer science and it is, therefore, no coincidence that the application of hydrosilylation to functionalise polymers was soon investigated (refs. 3, 4). However, these reactions have almost exclusively been investigated in solution. Although this offers certain advantages, such as good temperature control, mild reaction conditions, and good diffusion (homogenization), it is an energy and labour consuming process. The polymers have to be dissolved, precipitated after the reaction, and subsequently dried. The solvents have to be disposed of or they have to be recycled by distillation. Especially with polymers displaying a low solubility, this is a serious process limitation.

A patentability search conducted by the inventors as disclosed U.S. Pat. Nos. 4,803,244, 5,409,995 and 5,359,113 as potential prior art.

SUMMARY OF THE INVENTION

In accordance with the present invention, there is provided a method of functionalising a polymer in the melt phase by effecting hydrosilylation to terminal double bonds in a polymer to provide a terminal silane on the polymer.

The method of the present invention may be carried out through reactive extrusion, a method that has drawn more and more attention from the scientific community all over the world in recent years. The advantages of performing a reaction in an extruder are that the polymer may be functionalised and processed in the same step. An intermittent solidifying and remelting operation is not necessary. This single step operation saves time, labour, energy, and equipment costs.

Polypropylene is a major commodity polymer used in industry. The low price, good thermal and mechanical properties, chemical inertness, crystallinity and hydrophobic character of polypropylene are desired in many applications. On the other hand, these features restrict its use in other highly profitable areas which are currently dominated by engineering plastics.

Accordingly, the present invention provides a way to chemically alter polypropylene and other polymers to increase features, such as adhesion, chemical reactivity or hydrophilicity. This procedure further opens a path to the formation of interesting copolymers, the production of compatibilizers for inorganic fillers, or polymer blends.

GENERAL DESCRIPTION OF INVENTION

Peroxide degradation of polypropylene, used to improve rheological properties (refs. 5, 6), leads to the formation of vinylidenes at the terminal site of the polymer chain. Consequently, the opportunity is given to use the hydrosilylation reaction to selectively functionalise the polymer chain at this terminal site. Two different pathways are applicable to accomplish this task.

Figure 1:
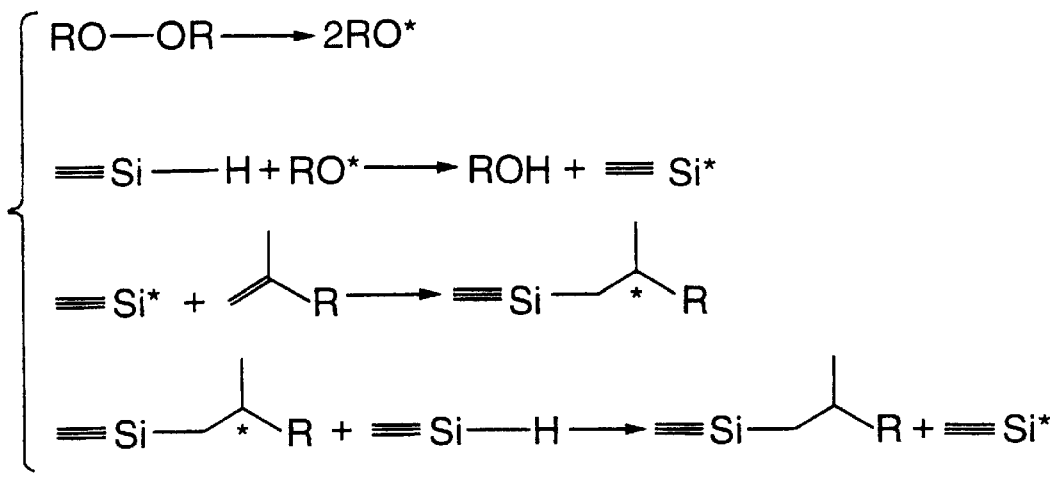
FIG. 1 shows a radically induced hydrosilylation reaction. The mechanism comprises the decay of the peroxide, the formation of a silyl radical, attack of the silyl radical on the double bond, and subsequent formation of a saturated organosilane and a new silyl radical.

The first is the radically-induced hydrosilylation (see FIG. 1). A peroxide initiator (RO—OR) is used to form Si radicals which attack the terminal double bond of the polymer under formation of a carbon radical. The reaction follows Farmer's (ref. 4) rule which states that the silyl radical will attack the carbon atom of the double bond bearing the most hydrogen atoms. The reason for this lies in the different stabilities of the carbon radicals. In the subsequent step, the newly formed carbon radical abstracts a hydrogen atom from a hydrosilane. This results in the formation of the saturated organosilane and a new silyl radical. The reaction chain is closed. This reaction mechanism is of special interest since peroxides are also used to perform the degradation of the polypropylene. However, it should be pointed out that radical reactions always bear the danger of side reactions and grafting along the polymer chain. This result is undesirable in the attempt to form a terminally functionalised product.

In 1957, J. L. Speier discovered the activity of hexachloroplatinic acid as a hydrosilylation catalyst. This material had such a high efficiency that it soon replaced all previous catalytic systems. The catalyst concentrations usually employed are in a range of about $10^{-5}$ mol platinum per mol of hydrosilane, though concentrations as low as $10^{-8}$ mol platinum per mol of hydrosilane have been reported (ref. 2). Today, even more reactive platinum catalysts are available. One of them is Karstedt's catalyst, namely platinum(O)- divinyltetramethyldisiloxane. As opposed to other highly reactive platinum olefin complexes, this catalyst can easily be derived from hexachloroplatinic acid (ref. 7) and is commercially available.

The mechanism of the platinum catalysed hydrosilylation with platinum olefin complexes such as Speier's or Karstedt's catalyst, was long believed to be of a homogeneous type, described by the mechanism of Chalk and Harrods (ref. 4). In 1986, Lewis (refs. 8 and 9) proposed that colloid formation is the initial step in the hydrosilylation reaction, when catalysed by a low valence platinum catalyst. This colloid is stabilized with oxygen which is adsorbed on the catalyst surface. The platinum-oxygen complex can coordinate a silane. The Si—H bond is not broken during this addition. The bonding is similar to that of the non-classical $H_2$ coordination (ref. 9). The newly formed complex has an electrophilic character. Oxygen functions as cocatalyst and activates the complex by withdrawing electrons. The olefin can now attack the transition complex nucleophilically, and the new organosilane is formed (see FIG. 2).

Oxygen stability is a very important feature in the catalyst performance in this procedure since it makes the application of expensive inert gas atmospheres unnecessary. However, the requirement of oxygen leads to problems of a different kind in reactions in the melt phase. At normal processing temperatures of polypropylene of about 200° C., oxygen reacts with the polymer chain, leading to degradation and formation of undesired oxidation products. Therefore, the oxygen necessary to activate the catalyst has to be introduced chemically, i.e as a peroxide (ref. 10). It is desirable to apply a peroxide with a long high half-life to ensure that the catalyst is activated during the complete course of the reaction, and to avoid excessive degradation due to the peroxide decay.

Although the invention is described herein with reference to polypropylene, the hydrosilylation process is applicable to all types of polyolefins or indeed any other polymer which is inert to the conditions of the hydrosilylation reaction and in which double bonds may be provided by degradation, such as by reaction with peroxide.

The present invention is concerned with the functionalization of terminal double bonds in polypropylene and other polymers while the formation of cross links is avoided, to yield a linear molecule. The terminal double bonds are created by peroxide degradation. The use of any other polypropylene with terminal vinylidene redicals (i.e. Metallocene PP, amorphous PP) is possible. The functionalization is performed by peroxide-initiated or platinum-catalysed hydrosilylation. In the case of the platinum-catalysed hydrosilylation reaction, t-butylhydroperoxide may be added as a cocatalyst. The reactions are performed in the melt phase of the polypropylene in typical processing equipment, i.e. an extruder, a batch mixer or other convenient equipment, such as a hot press. The reaction conditions are such that conversion of the reactants is high during the processing. Once the product leaves the equipment, no further treatment, such as curing or purifying is necessary. Degradation of the polypropylene to provide terminal unsaturation and hydrosilylation can be performed simultaneously or sequentially without intermittent solidification, as well as sequentially with intermittent solidification, as desired.

As described below, hydrosilylation was performed with a hydride terminated polydimethylsiloxane as a test substance. Preferred for purification reasons is the use of tetramethyldisiloxane. However, all hydride terminated di-, tri-, or polysiloxanes may be used. Hydride terminated di-, tri-, or polysilanes also may be utilized. Silanes with more than two Si—H groups preferably are not employed to avoid branching and cross linking reactions. The functionalization with one of the aforementioned hydrosilylation agents yields a polypropylene with a terminal Si—H group. Hence, a second hydrosilylation reaction can be performed on the product. Applications of the Si—H terminated polypropylene as a reactive compatibilizer are, therefore, possible.

A series of experiments has been carried out, as detailed below, which show that the hydrosilylation reaction can be used to functionalise terminal double bonds in polypropylene in the melt phase. If platinum is used to catalyze the reaction, a peroxide cocatalyst is necessary to maintain the catalytic activity. t-butylhydroperoxide has been shown to be a useful promoter. Other peroxides and hydroperoxides can be employed, however. Especially, the use of silylperoxides appears to be promising due to their long half life. The reaction time of the hydrosilylation reaction is short enough to be performed in an extruder. This makes it possible to functionalise the polypropylene while processing it. The platinum residuals do not influence the thermal stability of the product. The hydrosilylation reaction may also be induced by peroxides. If a high concentration of peroxides is used to effect terminal double bond formation, degradation and hydrosilylation can be performed simultaneously. Degraded polypropylene can be hydrosilylated with catalytic amounts of peroxide present.

Once the feasibility of the reaction has been shown, as set forth herein, the reaction also may be used to incorporate desired functional groups into the polypropylene. Modification of the terminal vinylidenes of the polypropylene with an organic function can be carried out in two ways. The first manner of proceeding is to use organosilanes to provide the desired organic function (see Equation 1 below). However, this procedure is limited by the commercial availability of these specific silanes required to introduce desired functionality. The second manner of proceeding is to use a difunctional tetramethyldisiloxane or other difunctional siloxane and an olefin with the desired function as reagents for a hydrosilylation reaction to form an organofunctionalized siloxane (ref. 17). The use of excess tetramethyldisiloxane in this reaction guarantees the formation of the desired monoadduct.

As described in more detail below, this technique was applied to produce a styrene-functionalized tetramethyldisiloxane (Equation 2 below) in a reactive extrusion process. Although styrene does not bear a true organic function, it is well suited as a model substance, since the phenolic ring can easily be detected by Fourier Transform Infrared Spectroscopy (FTIR). The reaction showed a high yield.

Of further interest is the use of organofunctional silanes and siloxanes for the hydrosilylation. One of the advantages of the platinum-catalysed hydrosilylation procedure described above is the tolerance of the reaction to functional groups. Oxiranes, acetals, esters, nitrites, amines, amides, nitro, ketone, carbamate, ether, isocyanate, phosphate, phosphonic dichloride, dialkoxy borane, sulfide, sulfone or carborane groups can be present without reacting. Many of these functional groups are of considerable interest in polymer science.

Two test reactions were performed to investigate this topic. First, excess tetramethyldisiloxane was used to hydrosilylate styrene. The reaction was platinum catalysed. After removal of the excess siloxane, a styrylsiloxane/ platinum solution was provided which could directly be used to functionalize the terminal double bond of the polypropylene. No further platinum catalyst was needed. This is important economically. In the second experiment, N,N-dimethylallylamine was reacted with excess tetramethyldisiloxane. The reaction product may be used to hydrosilylate the terminal double bonds of the polypropylene. This pathway of reacting tetramethyldisiloxane with an organofunctional olefin and subsequently hydrosilylating of the double bond containing polypropylene with the produced organofunctional siloxane can be applied to all organofunctional olefins which bear organic functions that are inert under conditions of the hydrosilylation reaction.

EXAMPLES

Example 1

This Example describes the materials used.

Polydimethylsiloxane, hydride terminated, Mw: 400 g/mol and Platinum divinyltetramethyldisiloxane-complex (Karstedt's catalyst) were received from United Chemical Technologies Inc., 2,5-dimethyl-2,5-(t-butylperoxy)hexane (Lupersol 101) was donated by Elf AtoChem, Polypropylene (KF 6100, high molecular weight, isotactic, MFI 3 g/10 min, ASTM D 1238 condition L) in powder form, unstabilized and as pellets, stabilized with Irganox 1010 was delivered by Montell. t-Butylhydroperoxide, anhydrous, 5 to 6M in decane, was received from Aldrich. Tetramethyldisiloxane was delivered by Fluka. Styrene was received from Eastman. Methanol and acetone were delivered from VWR, toluene, 99.5% for general use, was received from BDH. All chemicals and solvents were used as delivered.

Example 2

This Example describes the analytical procedures employed.
(a) Fourier Transform Infrared Spectroscopy (FTIR)

Spectra were taken with a Nicolet 520 mid-range (500 to 4000 cm$^{-1}$) FTIR. Due to its high sensitivity, FTIR proved to be the best analytical method to obtain reliable analytical results in these experiments. Sample material that had been cleaned following the procedure described in Example 5 below was pressed to a thin film in the hot press prior to analysis. Due to the relatively low viscosity of the degraded polypropylene, it was also possible to take molten samples from the batch mixer, or the extruder die and to spread a film between two spatula. Using this approach, films as thin as 10 $\mu$m thickness could be made.
(b) $^{-1}$H NMR $^{-1}$H NMR is very sensitive due to the high abundance of this isotope at 99.985% (ref. 11), as found in nature. This sensitivity was of great advantage in these experiments since the concentration of the chemically bound silane was very small. Spectra were taken using a Bruker AC-300 spectrometer. Due to the poor solubility of polypropylene, the samples had to be run at high temperatures up to 103° C. in deuterated toluene as solvent.
(c) Energy Dispersion X-ray Analysis (EDX)

Energy dispersion X-ray analysis (EDX) can be used to simultaneously evaluate different elements. Since the ratio of X-ray intensities from two elements is proportional to their relative concentrations in a material, the atomic fractions of these two elements in the specimen can be measured (ref. 12). Samples were prepared in form of a powder. Since EDX is a surface analysis technique, sample homogeneity has to be ensured. The analysis was performed by The Surface Science Laboratory, The University of Western Ontario, London, Canada.

Example 3

This Example illustrates the degradation of polypropylene.

Polypropylene (PP) was degraded to provide terminal unsaturation using 2,5-dimethyl-2,5-(t-butylperoxy) hexane (Lupersol 101), in concentrations of 0.5% to 5% by weight. A convention is used herein for the degraded material. The amount of peroxide used for the production of degraded polypropylene is shown in parenthesis, i.e. degraded PP (5 wt %). For degradations in a batch mixer, the polypropylene was mixed with the desired amount of peroxide and added to the preheated mixer at temperatures of 190° to 200° C. To avoid access of oxygen as well as material loss due to foaming, the mixer was closed with either a metal or a Teflon stamp. Though the bulk of the peroxide was consumed within 2 minutes, the degradation product was kneaded for 10 more minutes to ensure the complete removal of volatiles.

For degradations in a single screw extruder, the polypropylene was premixed with the desired amount of peroxide for the hydrosilylation reaction and the master batch was added via the hopper. The degradation was performed at temperatures of 220° C. and the screw speed was adjusted to give a residence time of 5 minutes. The degradation reaction products were either ground or transformed to powder by dissolution in toluene and subsequent precipitation with methanol.

Example 4

This Example describes various hydrosilylation reactions.

The equipment employed in a series of hydrosilylation reactions and the process conditions employed are summarized in Table 1 (below).

Figure 2:
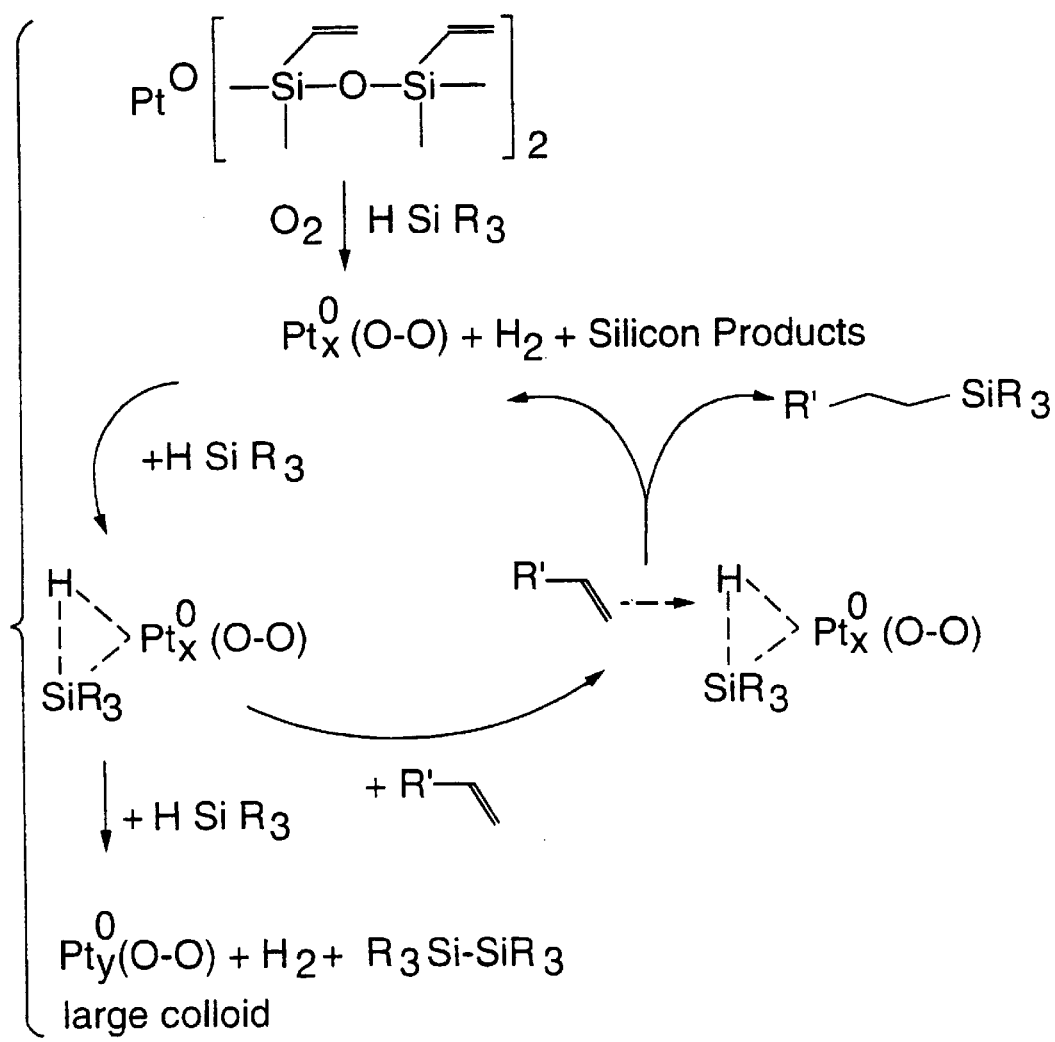
FIG. 2 shows a hydrosilylation reaction according to the mechanism of Lewis (refs. 8 and 9). The steps include the formation of the colloid, Si—H bond coordination to the surface of the oxygen stabilized platinum and finally, a nucleophilic attack of the olefin on the Si—H bond forming the new silicon product.

The hydrosilylation of degraded polypropylene, prepared as described in Example 3, with hydride terminated polydimethylsilsoxane was investigated. Two different reaction mechanisms were examined, radically induced hydrosilylation (I) (FIG. 1) and platinum catalysed addition (II) of the Si—H group to the double bond (FIG. 2). All reactions follow the same general reaction as expressed in equation (I) (below).
(a) Radically Induced Hydrosilylation (FIG. 1)

Figure 5:
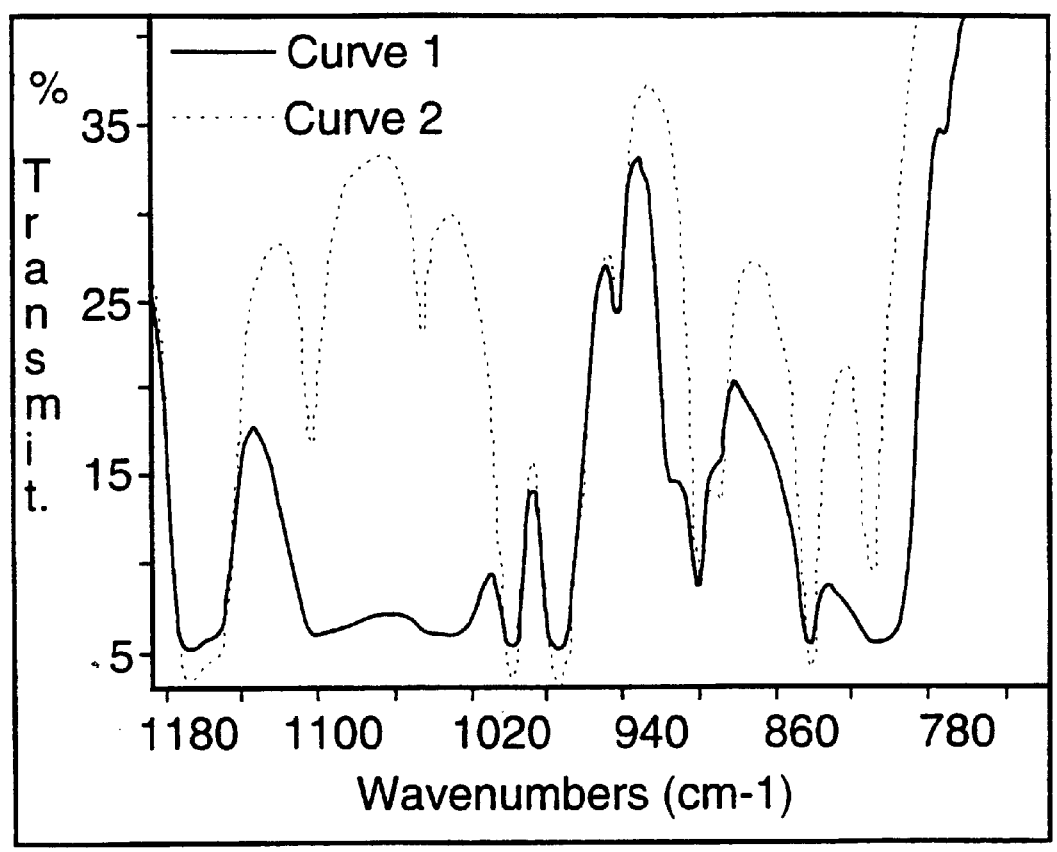
FIG. 5 shows the FTIR for degradation and simultaneous hydrosilylation of PP.

Since both the degradation of polypropylene and the hydrosilylation reaction itself, are induced by peroxides, it was attempted to effect both reactions in polypropylene simultaneously. 110 g of polypropylene, 5.8 g of peroxide and 10 g of polydimethylsiloxane were mixed to a master batch and added to the batch mixer at 200° C. for 5 minutes. After cleaning by repeated dissolution and subsequent precipitation, the material was investigated by FTIR. From the spectrum obtained (FIG. 5), it can be seen clearly that the siloxane had been incorporated into the polypropylene. This result is indicated by the Si—O—Si absorption at 1100–1030cm$^{-1}$. Further proof is given by the shoulders at 770 cm$^{-1}$ and 757 cm$^{-1}$, which can be attributed to Si—Me groups. The shoulder at 888 cm$^{-1}$ also indicates that the polymer still contained double bonds.

Performing degradation and hydrosilylation in parallel has one large disadvantage, that is the high concentration of radicals. This always bears the danger of side reactions, such as grafting along the chain or undesired recombinations of two radical species.

Degradation of the polypropylene with a high concentration of peroxide, such as 5 wt %, and subsequent hydrosilylation induced by catalytic amounts of peroxide eliminates this problem. A hot press experiment showed that 0.5 g of degraded polypropylene (5 wt %) was hydrosilylated with polydimethylsiloxane using 10 μl of Lupersol 101. The reaction proceeded at 160° C. for 15 minutes. The conversion of double bonds was high as may be deduced by the extinction of the shoulder at 888 cm$^{-1}$.

(b) Platinum Catalysed Hydrosilylation (FIG. 2)

The use of a platinum catalyst enables one to avoid the use of radicals completely. For the experiments, Karstedt's catalyst was used since it is highly active and commercially available. The catalyst concentration was $2.64 \times 10^{-4}$ g platinum per 1 gram of silane. The concentration of platinum in the polymer phase was of the order of $10^{-5}$ gm per gram of polymer. The actual catalytic species was a colloid formed by the reduction of the catalyst by the silane. The success of this reaction could easily be observed since the solution adopts a characteristic yellow colour due to this process. With polydimethylsiloxane and Karstedt's catalyst, the formation of the colloid was almost instantaneous. Usually the catalyst and the silane were combined prior to the introduction to the reaction vessel. The colloid was very stable and a silane-catalyst solution may be stored for several months in the refrigerator without notable reduction of the catalytic activity.

At processing temperatures of polypropylene of 200° C., the molten polymer reacts with atmospheric oxygen. This reaction leads to not only undesired degradation and to the formation of oxidation products, such as methyl ketones, esters, aldehydes and γ-lactones, but also to a termination of the hydrosilylation reaction due to the requirement of oxygen as cocatalyst. Experiments in a hot press extruder as well as in the batch mixer confirmed this theory. Even after long residence times, the conversion of double bonds was very low and virtually no silane was incorporated. Therefore, the catalyst has to be stabilized with a peroxide (ref. 10). The choice of the stabilizing peroxide is important. High concentrations of radicals should be avoided. This condition is important not only to reduce the chances of side reactions but also to prove the catalytic effect of the added peroxide.

t-Butyl hydroperoxide with its half life time of 60 min at 193° C. (ref. 13) appeared to be the most suitable candidate and was applied in a 6 M solution in decane. Although literature suggests the use of peroxide concentrations in the order of 0.1 to 1% per weight reactants (ref. 10), experiments showed that much lower concentrations were catalytically active. On average, 2 μl t-butylhydroperoxide solution were added to 11 g of reactants. This quantity equals a concentration of 0.1% by weight.

Figure 3:
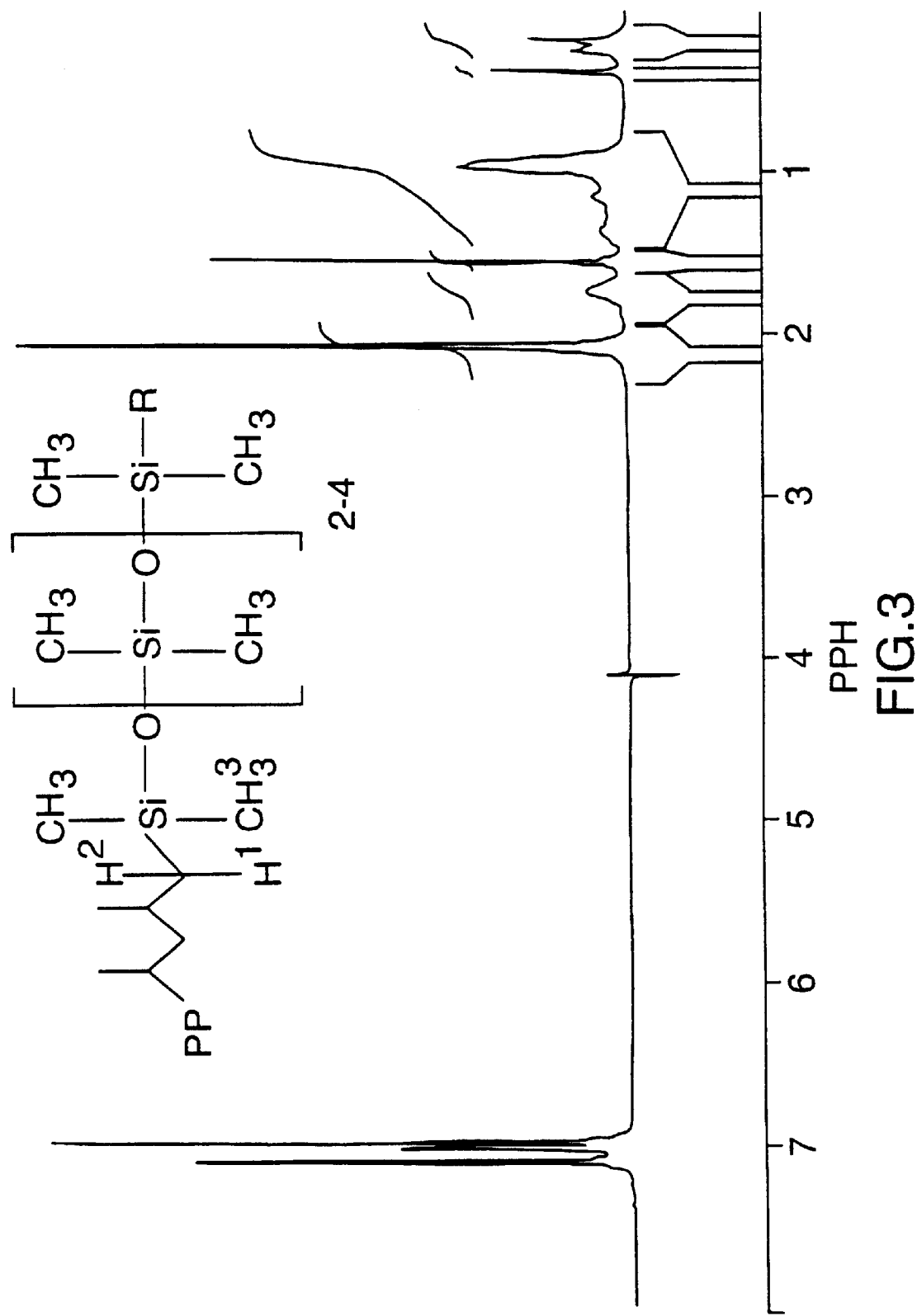
FIG. 3 shows the $^1$H NMR of hydrosilylated polypropylene (5 wt %).
Figure 6:
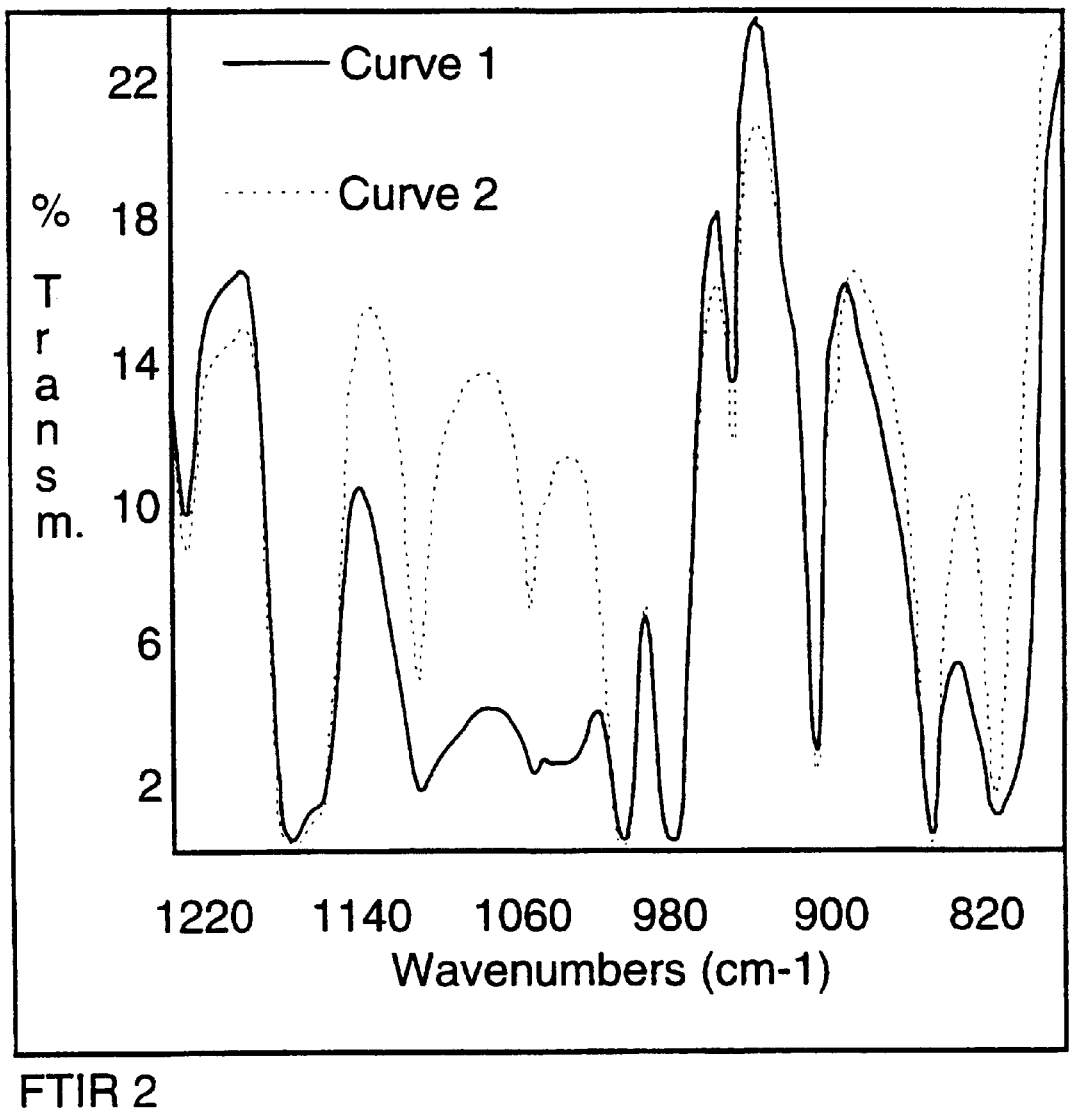
FIG. 6 shows the influence of t-butylhydroperoxide on the activity of the catalyst.

In an experiment in the batch mixer, 200 g of polypropylene (0.5 wt %) were melted at 180° C. A mixture of 5 g polydimethylsiloxane and 100 μl of Karstedt's catalyst were added. A polymer sample was withdrawn after 30 minutes. Subsequently 400 μl of t-butylhydroperoxide in acetone (dried over CaCl$_2$) were added with a syringe. After another further 30 minutes, a second polymer sample was withdrawn. Both samples were cleaned following the procedure of Example 3 (FIG. 3). FIG. 6 clearly shows that the reaction does not proceed without addition of a cocatalyst. No siloxane absorption can be observed in Curve I. After addition of the t-butylhydroperoxide, hydrosilylation of the polypropylene took place. Curve II shows that the double bonds (888 cm$^{-1}$) were converted, and the siloxane absorption at 1036 cm$^{-1}$ proves that silane was incorporated.

In another experiment, polypropylene was degraded with 5 wt %. of Lupersol 101 in the batch mixer at 200° C. for 10 minutes. After the degradation the material was cooled over a period of 20 minutes to 170° C. to ensure complete peroxide degradation. After addition of 10 g polydimethylsiloxane and 100 μl of platinum catalyst, the hydrosilylation of the molten polypropylene proceeded without delay. This appears to contradict the previous result. However, the degradation in the batch mixer was performed in the presence of atmospheric oxygen. The first step of the thermal oxidation of polypropylene is the formation of a hydroperoxide (ref. 14). Usually, it can be assumed that the life time of the hydroperoxide is relatively short. However, it can be speculated that, after 30 minutes, the concentration of hydroperoxides was still high enough to support the catalyst.

The hydrosilylation reaction on molten polypropylene was also performed in a single screw extruder and a $2^2$ full factorial design experiment was performed to investigate the ideal reaction conditions. Screw speed (parameter 1) and temperature (parameter 2) were used as independent variables. The other experimental parameters are given in Table 2 (below). The degraded polypropylene, siloxane, platinum catalyst, and t-butylhydroperoxide cocatalyst were added via the hopper as a master batch. Samples of the reaction product were taken at the die and spread to a film which was subsequently analysed by FTIR without further cleaning. The quantitative evaluation was done measuring the peak height of the vinyl absorption at 888.5 cm$^{-1}$ and comparing it with the polypropylene backbone peak at 973 cm$^{-1}$. This resulted in a relative concentration of double bonds, and the results are summarized in Table 3 (below). According to the nomenclature of a full factorial design (ref. 15) "−−" symbolizes the experiment with both parameters at their lower level, "++" symbolizes the experiment with both parameters at their upper level and "+−" and "−+" symbolize the experiments with one parameter at the upper level and one parameter at the lower level. For evaluation of the standard deviation of the experimental data the centre point of the design plan was repeated four times. The results are summarized in Table 4 (below).

From the experimental results set forth in this Example, it can be concluded that the screw speed, and with it the residence time, had the largest influence on the double bond conversion and thus on the silane incorporation. Somewhat surprising was the small temperature influence. The statistical evaluation showed that the effect was not significant. The two factor interaction, however, was significant. Its negative value showed that the interaction lead to a reduction of double bonds, that is, an increase in hydrosilylation product. An explanation of this result might be that the hydrosilylation reaction is relatively fast at the processing temperature, such that diffusion becomes the rate determining step. A shorter residence time means that less time is available for the Si—H group to diffuse to the double bond, although an increase in RPM increases the mixing in the extruder. With the increase in temperature, the viscosity of the polymer drops which facilitates diffusion and viscous dissipation. This is indicated by the two factor interaction.

Example 5

This Example describes a cleaning procedure as used in Example 4.

FTIR analysis cannot distinguish between bound and unbounded siloxanes. Therefore, a thorough cleaning procedure had to be developed to ensure complete removal of excess silanes from the treated polymer prior to analysis. This cleaning procedure was effected by dissolution of the hydrosilylation product in boiling toluene and subsequent precipitation with methanol. Threefold application of this procedure yielded a clean material which contained only chemically bonded silanes. If the precipitation was accomplished with dry acetone, the unreacted Si—H group of the difunctional siloxane could be preserved.

Example 6

This Example illustrates further hydrosilylation reactions.

Three hydrosilylated polypropylene samples were prepared in the single screw extruder under the conditions described in Table 5 (below). The samples were cleaned following the cleaning procedure of Example 5. The precipitate was subsequently dried and the powder yielded was sent for elemental analysis by energy dispersive X-ray spectroscopy (EDX). The results are summarized in Table 6 (below).

The application of $^1$H NMR proved the connection between the polypropylene and the siloxane. FIG. 3 shows the result of a hydrosilylation reaction of 5 wt % polypropylene with polydimethylsiloxane in the Haake mixer. The singlet at 0.4 ppm can be assigned to the protons (No. 1+2) of the methylene carbon which is connected to the siloxane. Theoretically, this peak should split into a doublet due to proton-proton coupling. Dvornic (ref. 16), reported a similar case, where the hydrogens of a methylene carbon connected to a siloxane only appeared as a singlet. The multiplet between 0.27 ppm–0.2 ppm is due to the hydrogens (No. 3) of the siloxane methyls.

One advantage of reactive extrusion is that the polymer may be functionalized and reacted in one step. This operation, however, requires that all reactants remaining in the product do not harm its quality. In the case of the platinum catalysed hydrosilylation reaction, the influence of the platinum colloid on the stability of the polypropylene has to be considered.

Figure 4:
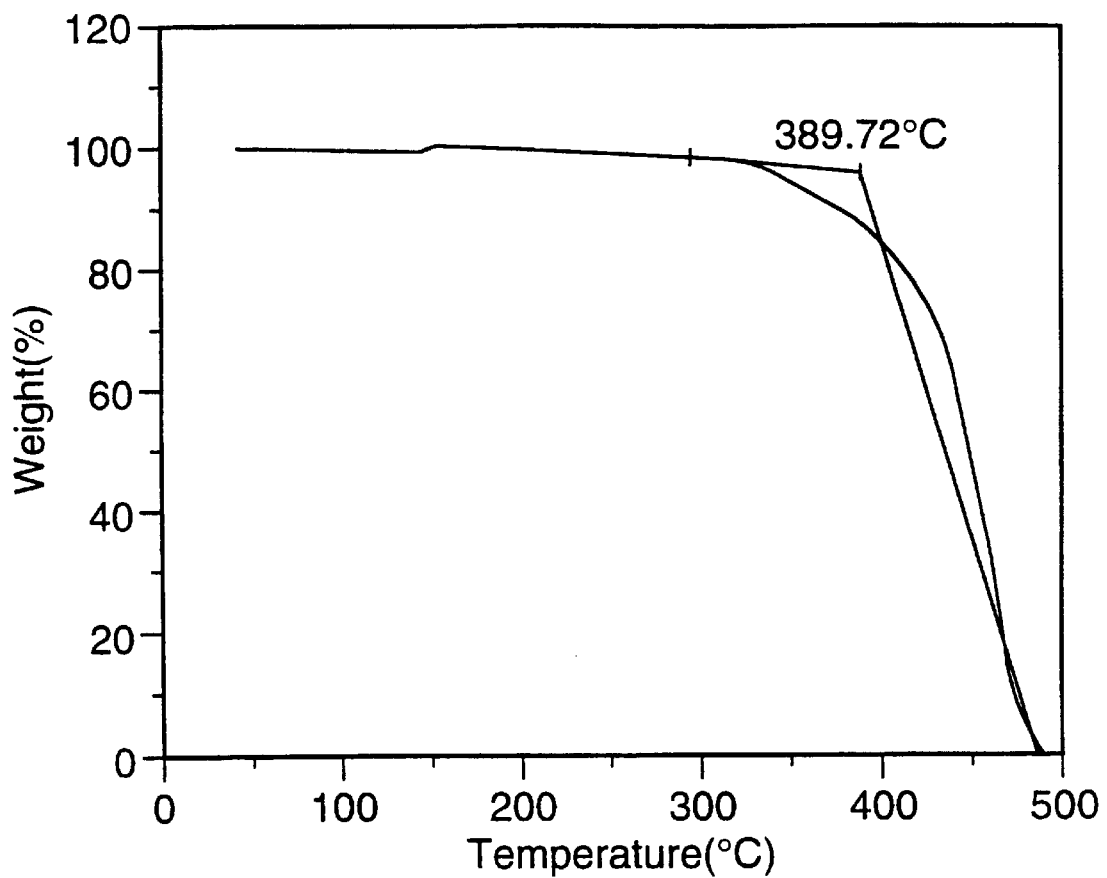
FIG. 4 is a thermogram of hydrosilylated polypropylene (5 wt %).

To investigate this issue, a thermogravimetric experiment was performed. A sample of a degraded polypropylene (5 wt %) which had been hydrosilylated in the single screw extruder was heated in a helium atmosphere to 500° C. with a temperature ramp rate of 20° C./min. As can be seen from the thermogram of FIG. 4, the onset of the thermal degradation was observed at 389.72° C. At processing temperatures of 200° C. the material was stable; no degradation was observed. For comparison degraded polypropylene (5 wt %) was investigated under the same conditions. Here, the onset temperature of the thermal degradation was at 407.8° C. This shows that the presence of the platinum catalyst has no detrimental influence on the thermal stability of polypropylene.

Example 7

This Example describes the hydrosilylation of styrene.

Figure 7:
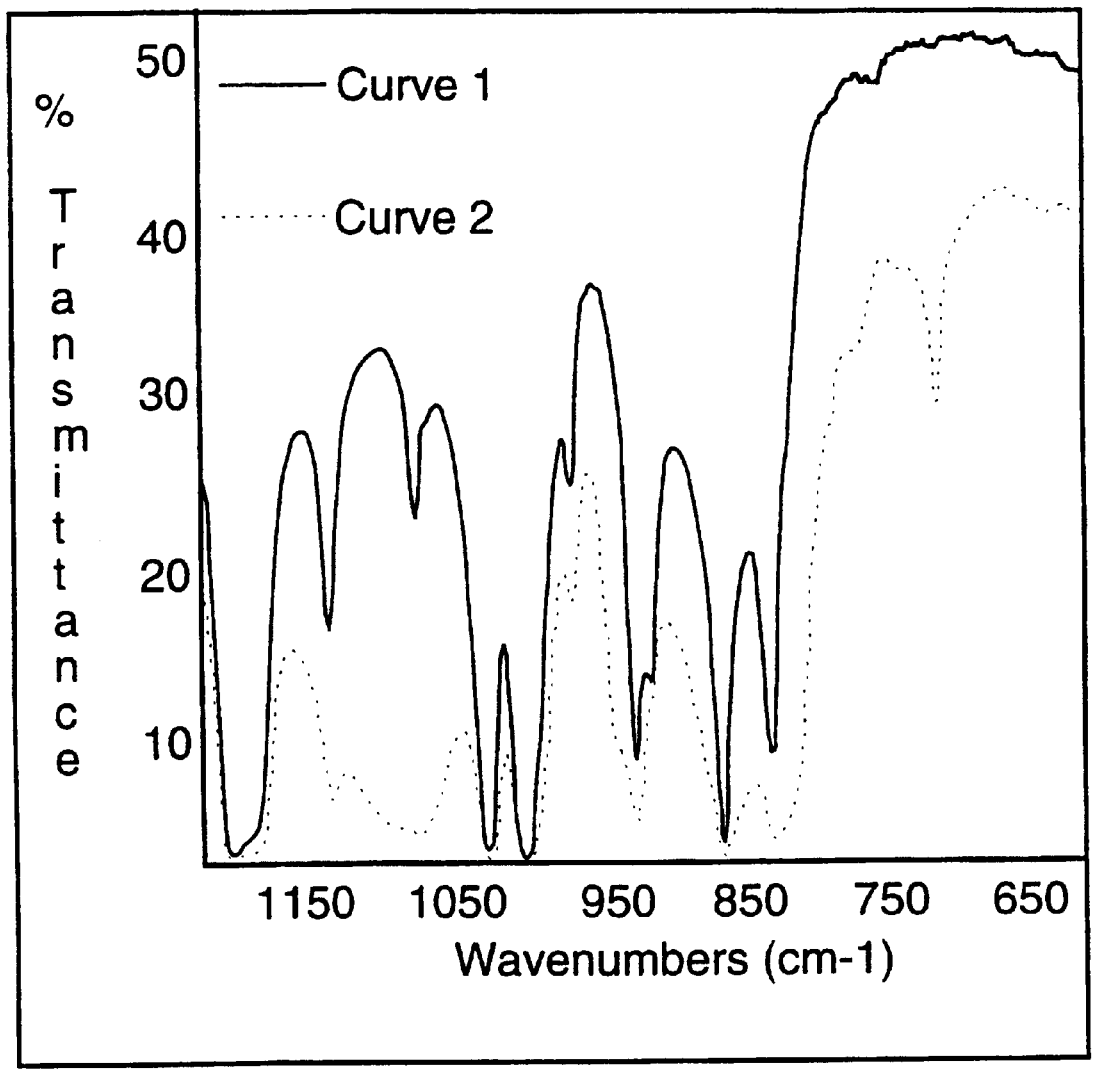
FIG. 7 illustrates hydrosilylation of PP (5 wt %) with a styryl-siloxane.

0.2 mol (26.86 g) of tetramethyldisiloxane and 0.02 mol (2.08 g) of styrene were added to a round bottomed flask together with 40 µl of Karstedt's catalyst. The reaction was allowed to proceed for 6 hours at temperatures of 70° C. to ensure complete conversion. The residual siloxane was removed by distillation. After removal of the excess siloxane, t-butylhydroperoxide was added to the styrylsiloxane catalyst solution, which was consequently added to polypropylene powder. The material was reacted in the hot press at 200° C. for 30 min. After cleaning following the procedure of Example 4, the product was investigated by FTIR. It can be seen from FIG. 7 that the characteristic double bond absorption at 888 cm$^{-1}$ is nearly extinguished. The Si—O—Si absorption at 1050 cm$^{-1}$ indicates the incorporation of tetramethyldisiloxane. The success of the reaction is further supported by the occurrence of a peak at 699 cm$^{-1}$ which indicates the presence of the styrene in the polymer phase. It is emphasized that no additional platinum catalyst had to be used. The platinum, which had been used in the production of the styryl-siloxane, was activated sufficiently enough with t-butylhydroperoxide to catalyse the hydrosilylation of the polypropylene (see Equation (2)).

SUMMARY OF DISCLOSURE

In summary of this disclosure, hydrosilylation of terminal unsaturation in polypropylene and other polymers is effected in the melt phase, by peroxide-initiated or platinum catalyzed reaction. The reaction may be employed to provide a terminal Si—H group for further reaction or to introduce organic functionality into the polymer. Modifications are possible within the scope of this invention.

TABLE 1

Overview of Different Reaction Vessels

| Device | Temperature | Mixing | Pressure | Residence Time |
|---|---|---|---|---|
| hot press | 160–200° C. | no | yes | 15 min–1 h |
| batch mixer | 160–180° C. | yes | no | up to 2 h |
| extruder | 170–230° C. | yes | yes | 2–8 min. |

TABLE 2

Conditions of $2^2$ full Factorial Design

| Variable | Value |
|---|---|
| screw speed | 10–50 RPM |
| temperature | 170–210° C. |
| silane | polydimethylsiloxane (4 g) |
| degraded polypropylene (5 wt %) | (40 g) |
| Pt-catalyst | 40 µL |
| t-butylhydroperoxide | 80 µL |
| nozzle diameter | 1 mm |

TABLE 3

Relative Concentration of the Double Bond in $2^2$ Full Factorial Design

| Experiment | screw speed in RPM | Temperature in ° C. | relative Conc. |
|---|---|---|---|
| centre point 1 | 30 | 190 | 0.1184 |
| centre point 2 | 30 | 190 | 0.1137 |
| centre point 3 | 30 | 190 | 0.1173 |
| centre point 4 | 30 | 190 | 0.1098 |
| − − | 10 | 170 | 0.0988 |
| + − | 50 | 170 | 0.1370 |
| − + | 10 | 210 | 0.1060 |
| + + | 50 | 210 | 0.1187 |

TABLE 4

Results of $2^2$ Full Factorial Design

| β values | F-test results | standard deviation | F-distribution |
|---|---|---|---|
| $\beta_0$ = 0.11512 | | (center point) | |
| | | $\alpha^2$ = 1.515*10$^{-5}$ | Upper 10%:5:54 |
| | | | Upper 5%:10.13 |
| | | | Upper 1%:34.21 |

TABLE 4-continued

Results of $2^2$ Full Factorial Design

| β values | F-test results | standard deviation | F-distribution |
|---|---|---|---|
| $\beta_1$ = 0.01272 | $F_1$ = 42.01 | | |
| $\beta_2$ = 0.002775 | $F_2$ = 2.035 | | |
| $\beta_3$ = 0.006375 | $F_3$ = 10.737 | | |

TABLE 5

Conditions of Experiments for Quantitative Analysis

| Variable | Value |
|---|---|
| screw speed | 20 RPM |
| temperature | 200° C. |
| silane | polydimethylsiloxane (4 g) |
| degraded polypropylene | 5 wt % (40 g) |
| Pt-catalyst | 40 μL |
| t-butylhydroperoxide | 80 μL |
| nozzle diameter | 1 mm |

TABLE 6

Results of Quantitative Analysis (in Atomic %)

| Sample | Carbon | Oxygen | Silicon | Si/C |
|---|---|---|---|---|
| No. 1-area 1 | 93.9 | 5.6 | 0.4 | 0.0043 |
| No. 1-area 2 | 94.0 | 5.5 | 0.5 | 0.0053 |
| No. 1-area 3 | 95.4 | 4.1 | 0.5 | 0.0052 |
| No. 2-area 1 | 94.9 | 4.6 | 0.5 | 0.0053 |
| No. 2-area 2 | 95.4 | 3.7 | 0.9 | 0.0094 |
| No. 2-area 3 | 95.2 | 4.9 | 0.5 | 0.0053 |
| No. 3-area 1 | 95.4 | 4.3 | 0.3 | 0.0031 |
| No. 3-area 2 | 94.8 | 4.9 | 0.4 | 0.0042 |
| No. 3-area 3 | 94.0 | 5.7 | 0.3 | 0.0032 |

Insert Equations 1 and 2.

PP + H Si R → PP Si R

R=organic functionality
Equation 1

REFERENCES

1. Sommer, L. H., Pietrusza, E. W. & Whitmore, F. C., *J Am. Chem. Soc.* 69: 188 (1947).

2. Ojima, I. in *The chemistry of Organic Silicon Compounds* (eds Patai, S. & Rappoport, Z.) 1479–1527 (John Wiley and Sons Ltd. New York, Toronto, 1989).

3. Mc Grath, M. P., Sall, E. D. & Tremont, S. *J. Chem. Rev.* 95: 381–398 (1995).

4. Marciniec, B. Gulinski, J. Urbaniac, W. & Kometka, Z. W., *Comprehensive Handbook On Hydrosilylation* (Pergamon Press, Oxford, New York, Seoul, Tokyo, 1992).

5. Dom, M., *Advances in Polymer Technology* 5, 87–97 (1995).

6. Tzoganakis, C., Peroxide Degradation Of Polypropylene During Reactive Extrusion. (1988). McMaster University. Ph.D.

7. Karstedt, B. D. inventor. U.S. Pat. No. 3,715,334. (1973).

8. Lewis, L. N. & Lewis, N., *J Am. Chem. Soc.* 108: 7228–7231 (1986).

9. Lewis, L. N., *J Am. Chem. Soc.* 112: 5998–6004 (1990).

10. Bank, H. M. inventor. U.S. Pat. No. 5,359,113. (1994).

11. Taylor, R. B., Parbhoo, B. & Fillmore, D. M. in *The Analytical Chemistry of Silicones* (ed Smith, A. L.) 347–419 (John Wiley and Sons, New York, Toronto, 1991).

12. Goldstein, G. I. *Scanning Electron Microscopy and X-Ray Micro-Analysis* (Plenum Press, New York, London, 1981).

13. Atochem, Evaluation of Organic Peroxides From Half-Life Data. (1992).

14. Hinsken, H., Moss, S., Pauquet, J. & Zweifel, H. *Polymer Degradation and Stability* 34: 279–293 (1991).

15. Box, G. E. P. Hunter, W. G. & Hunter, S. J. *Statistics For Experimenters* (John Wiley & Sons Inc. New York, Toronto, 1995).

16. Dvornic, P. R. & Gerov, V. V. *Macromolecules* 27: 1068–1070 (1994).

17. Hazziza-Lasker, J. Helary, G. & Sauvet, G., *Makromol. Chem. Macromol. Symp.* 47: 383–391 (1991).

What we claim is:

1. A method of hydrosilylation of a polymer, which comprises:

effecting hydrosilylation of unsaturation in a polymer in the melt phase of the polymer to provide a silane on the polymer.

2. The method of claim 1 wherein said hydrosilylation of the polymer in the melt phase is effected by reactive extrusion.

3. The method of claim 2 wherein said polymer is polypropylene with a terminal unsaturation.

4. The method of claim 3 wherein said terminal unsaturation is provided in said polypropylene by reaction with peroxide.

5. The method of claim 4 wherein said terminal double bonds are formed during said reactive extrusion.

6. The method of claim 4 wherein said hydrosilylation reaction is effected by a radically-induced hydrosilylation reaction in which a peroxide initiator is reacted with a hydrosilane to form a silyl radical and the silyl radical attacks the terminal double bond to form a saturated organosilane and a new silyl radical.

7. The method of claim 6 wherein said hydrosilane is a hydride terminated polydimethylsiloxane.

8. The method of claim 4 wherein said hydrosilylation reaction is effected by platinum catalysis, an Si—H bond of a hydrosilane is coordinated to the surface of oxygen-stabilized platinum to form a colloid, and nucleophilic attack of the terminal double bond is effected on the Si—H bond in the colloid to form a saturated organosilane.

9. The method of claim 8 wherein oxygen is provided by a peroxide cocatalyst.

10. The method of claim 9 wherein said peroxide cocatalyst is a silyl peroxide.

11. The method of claim 9 wherein said peroxide cocatalyst is t-butylhydroperoxide.

12. The method of claim 8 which is carried out using a platinum divinyltetramethyldisiloxane complex (Karstedt's catalyst).

13. The method of claim 1 which is used to introduce a desired organic functionality to the polymer.

14. The method of claim 13 wherein said polymer is polypropylene.

15. The method of claim 13 wherein said desired organic functionality is introduced by employing an organosilane in the hydrosilylation reaction which bears the desired organic functionality.

16. The method of claim 14 wherein said desired organic functionality is introduced by reacting an olefin with the desired organic functionality and a polydimethylsiloxane with the terminal double bond on the polypropylene.

* * * * *